United States Patent
Shui et al.

(10) Patent No.: US 11,995,923 B2
(45) Date of Patent: May 28, 2024

(54) VEHICLE POWERTRAIN CONTROL SYSTEM

(71) Applicant: FORD GLOBAL TECHNOLOGIES, LLC, Dearborn, MI (US)

(72) Inventors: Huanyi Shui, Ann Arbor, MI (US); Yijing Zhang, Canton, MI (US); Hang Yang, Ann Arbor, MI (US); Devesh Upadhyay, Canton, MI (US); Hiral Jayantilal Haria, Ypsilanti, MI (US); Yuji Fujii, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 17/212,439

(22) Filed: Mar. 25, 2021

(65) Prior Publication Data

US 2022/0309845 A1     Sep. 29, 2022

(51) Int. Cl.
 *G07C 5/08*  (2006.01)
 *B60W 30/188*  (2012.01)

(52) U.S. Cl.
 CPC ......... *G07C 5/0816* (2013.01); *B60W 30/188* (2013.01); *B60W 2510/0208* (2013.01); *B60W 2510/0275* (2013.01)

(58) Field of Classification Search
 None
 See application file for complete search history.

(56) References Cited

U.S. PATENT DOCUMENTS

| | | | | |
|---|---|---|---|---|
| 5,742,917 A * | 4/1998 | Matsuno | ............. | B60K 28/165 701/88 |
| 6,154,702 A * | 11/2000 | Fodor | ................... | B60W 10/06 701/87 |
| 6,640,178 B2 * | 10/2003 | Wakamatsu | ........... | B60W 10/11 477/107 |
| 7,203,578 B2 * | 4/2007 | Kuang | .................. | B60W 40/10 701/22 |
| 7,920,950 B2 * | 4/2011 | Nihanda | ............. | F02D 41/1497 701/69 |
| 8,775,044 B2 * | 7/2014 | Teslak | ..................... | F16D 67/02 701/67 |
| 8,998,771 B2 * | 4/2015 | Pietron | ................. | B60W 10/02 903/946 |

(Continued)

FOREIGN PATENT DOCUMENTS

| | | | | | |
|---|---|---|---|---|---|
| CN | 113217619 | A * | 8/2021 | ............. | F16D 25/14 |
| FR | 2947600 | A3 * | 1/2011 | ............. | F16D 48/06 |
| WO | WO-02055903 | A2 * | 7/2002 | ............. | B60K 6/485 |

OTHER PUBLICATIONS

English translation (via PE2E) for CN 113217619 (Year: 2021).*
English translation (via PE2E) for FR 2947600 (Year: 2011).*
English translation (via PE2E) for WO 02055903 (Year: 2002).*

*Primary Examiner* — Thomas E Worden
(74) *Attorney, Agent, or Firm* — Vincent Mastrogiacomo; Brooks Kushman P.C.

(57) ABSTRACT

A vehicle includes an engine, a clutch, and a controller. The clutch is configured to crank the engine during an engine start. The controller is programmed to, in response to a command to start the engine, adjust a clutch actuator pressure to drive a disconnect clutch torque toward a desired value. The controller is further programmed to, in response to variances of the disconnect clutch torque relative to the clutch actuator pressure exceeding a threshold, issue a disconnect clutch fault.

20 Claims, 4 Drawing Sheets

(56) References Cited

U.S. PATENT DOCUMENTS

| | | | |
|---|---|---|---|
| 9,108,614 B2* | 8/2015 | Doering | F16H 61/02 |
| 9,258,284 B2* | 2/2016 | Tanaka | H04L 63/061 |
| 9,423,022 B2* | 8/2016 | Turner | F16H 61/0213 |
| 9,512,889 B2* | 12/2016 | Pietron | F16D 48/06 |
| 9,551,415 B2* | 1/2017 | Fodor | B60W 30/18027 |
| 10,571,022 B2 | 2/2020 | Meyer et al. | |
| 11,209,054 B1* | 12/2021 | Zhang | F16D 48/066 |
| 11,498,566 B2* | 11/2022 | Chen | B60W 30/188 |
| 2010/0222961 A1* | 9/2010 | Dlugoss | G01L 25/003 |
| | | | 701/29.2 |
| 2013/0153353 A1* | 6/2013 | Teslak | F16H 61/04 |
| | | | 192/48.1 |
| 2014/0195082 A1* | 7/2014 | Takamura | B60L 7/14 |
| | | | 903/946 |
| 2014/0342869 A1* | 11/2014 | Maurer | B60K 17/16 |
| | | | 475/198 |
| 2015/0066264 A1* | 3/2015 | Wang | B60W 10/08 |
| | | | 903/902 |
| 2015/0274146 A1* | 10/2015 | Doering | B60W 10/02 |
| | | | 477/79 |
| 2016/0031431 A1* | 2/2016 | Johri | B60W 20/10 |
| | | | 180/65.265 |
| 2016/0159352 A1* | 6/2016 | Kim | B60W 30/143 |
| | | | 701/93 |
| 2018/0022353 A1* | 1/2018 | Thompson | B60W 20/00 |
| | | | 701/22 |
| 2018/0245692 A1* | 8/2018 | Meyer | B60W 10/02 |
| 2018/0251118 A1* | 9/2018 | Gaither | B60L 7/10 |
| 2019/0096146 A1* | 3/2019 | Terashima | G07C 5/0816 |
| 2019/0176798 A1* | 6/2019 | Ford | B60K 6/387 |
| 2019/0283766 A1* | 9/2019 | Jensen | B60W 10/10 |
| 2020/0202057 A1* | 6/2020 | Chen | G06F 30/27 |
| 2021/0291807 A1* | 9/2021 | Hayasaka | B60W 10/06 |
| 2022/0269834 A1* | 8/2022 | Yang | G06N 20/10 |

* cited by examiner

VEHICLE POWERTRAIN CONTROL SYSTEM

TECHNICAL FIELD

The present disclosure relates to control systems for vehicles and vehicle powertrains.

BACKGROUND

Vehicles may include power generating devices, such as an engine or an electric motor, that are configured to generate torque within a powertrain of the vehicle in order to propel the vehicle.

SUMMARY

A vehicle includes an engine, a clutch, and a controller. The clutch is configured to crank the engine during an engine start. The controller is programmed to, in response to a command to start the engine, adjust a clutch actuator pressure to drive a disconnect clutch torque toward a desired value. The controller is further programmed to, in response to variances of the disconnect clutch torque relative to the clutch actuator pressure exceeding a threshold, issue a disconnect clutch fault.

A vehicle includes a powertrain and controller. The powertrain includes a transmission, an engine, and a disconnect clutch. The transmission has an input and an output. The engine is configured to generate and deliver torque to the input. The disconnect clutch is configured to connect and disconnect the engine from the input, and to crank the engine to start the engine. The controller is programmed to, in response to each of a plurality of commands to start the engine via the disconnect clutch, close the disconnect clutch, adjust a transfer function that represents the relationship between the torque of the disconnect clutch and the clutch actuator pressure, and control the disconnect clutch torque based on the transfer function. The controller is further programmed to, in response to variances of the disconnect clutch torque exceeding a threshold, issue a disconnect clutch fault.

A vehicle includes a transmission, an engine, an electric machine, a disconnect clutch, an inertial measurement unit, and a controller. The transmission has an input and an output. The engine is configured to generate and deliver torque to the input. The electric machine is configured to generate and deliver torque to the input. The disconnect clutch is configured to connect and disconnect the engine from the input, and to crank the engine to start the engine. The inertial measurement unit is configured to measure inertial forces exerted onto the vehicle. The controller is programmed to, in response to a demanded torque at the output, control the torque at the output based on a mapped relationship between the inertial forces and a vehicle velocity. The controller is further programmed to, in response to each of a plurality of commands to start the engine, close the disconnect clutch to start the engine, calculate the torque of the disconnect clutch based on the controlled torque at the output and an electric machine torque, map the relationship between the torque of the disconnect clutch and a clutch actuator pressure to adjust a transfer function that represents the relationship between the torque of the disconnect clutch and the clutch actuator pressure, and control the torque of the disconnect clutch based on the transfer function. The controller is further programmed to, periodically initiate diagnostic tests to detect changes in mean values and variances of disconnect clutch torque values relative to clutch actuator pressure values. The controller is further programmed to, in response to the changes in the variances exceeding a threshold, issue a disconnect clutch fault.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
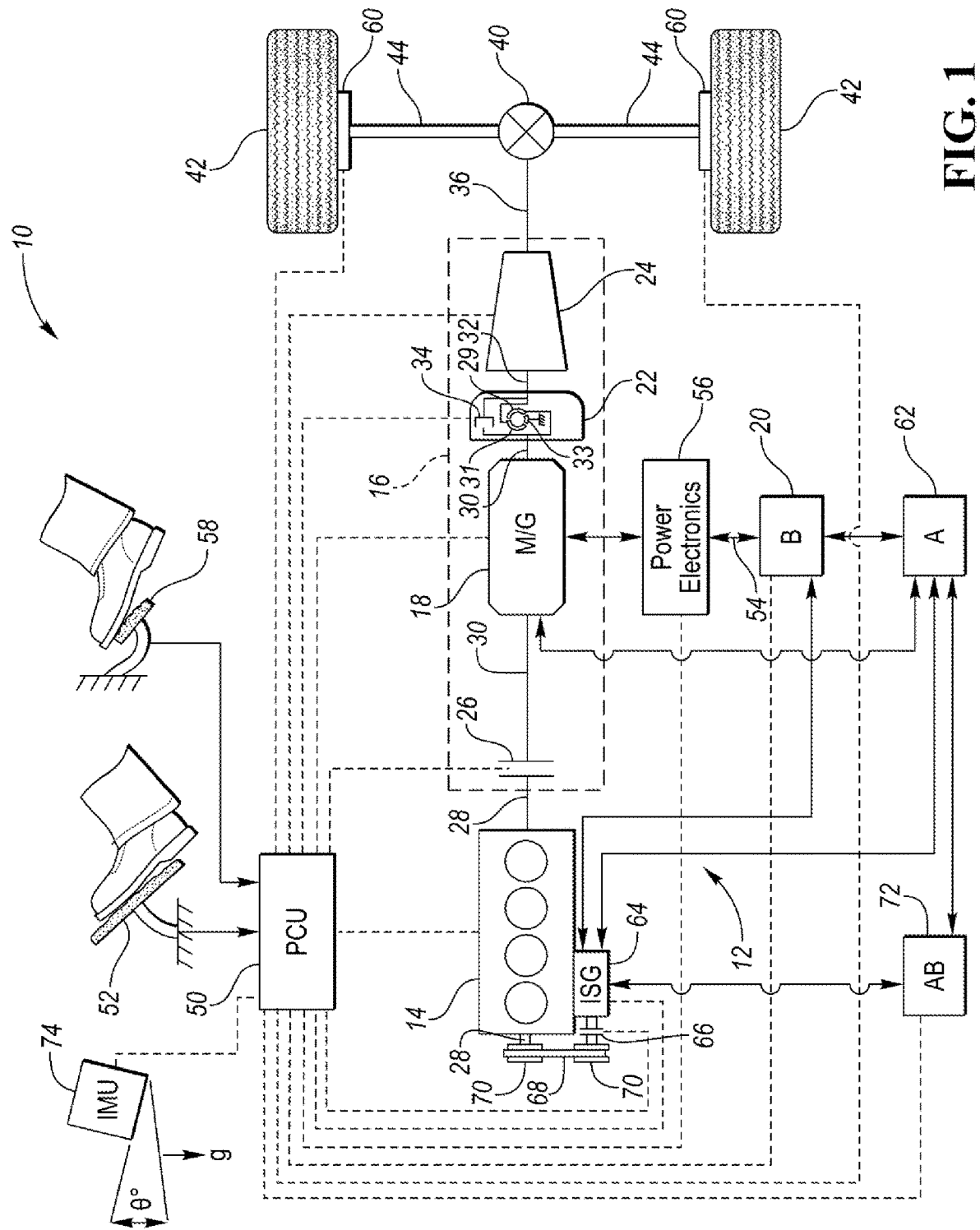
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain.

The engine 14 and the M/G 18 are both drive sources or powerplants for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller 29 fixed to M/G shaft 30, a turbine 31 fixed to a transmission input shaft 32, and a stator 33 that is grounded such that it does not rotate. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be configured to transition between an opened (or disconnected) state, a closed (or locked) state, and a slipping state. The rotation of the impeller 29 and the turbine 31 are synchronized when the torque converter bypass clutch 34 is in the closed or locked state. The rotation of the impeller 29 and the turbine 31 are non-synchronized when the torque converter bypass clutch 34 is in the opened state or the slipping state.

The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. In another alternative embodiment, the M/G 18 may be disposed between the gearbox 24 and the differential 40. In such an alternative embodiment, where the M/G 18 is disposed between the gearbox 24 and the differential, one or more launch clutches or a torque converter may be disposed between the engine and the gearbox 24.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example. A pressure transducer may be utilized to measure a hydraulic pressure applied to a hydraulic actuator of the disconnect clutch 26.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine power and/or torque through the disconnect clutch 26 to the M/G 18, and then from the M/G 18 to shaft 30 (i.e., the impeller of the torque converter 22) and through the torque converter 22 and gearbox 24. The M/G 18 may assist the engine 14 by providing additional power and/or torque to turn the shaft 30 (i.e., the impeller of the torque converter 22). This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative power and/or torque to the shaft 30 (i.e., the impeller of the torque converter 22). This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an opened state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

The vehicle 10 also includes an inertial measurement unit 74. The inertial measurement unit 74 is an electronic device that measures the vehicle's specific force, inertial forces acting upon the vehicle, angular rate of the vehicle, orientation of the vehicle, acceleration of the vehicle in multiple directions, attitude of the vehicle, pitch of the vehicle, etc., using a combination of accelerometers, gyroscopes, magnetometers and/or other sensors. The inertial measurement unit 74 may utilize such sensors along multiple axes to provide an estimation of the vehicle's orientation in space. The various measurements taken by the inertial measurement unit 74 may be communicated to the controller 50.

It should also be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered by an engine only, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

A wet clutch, which may be controlled by a hydraulic actuator such as a hydraulic piston, may be utilized in automotive propulsion systems for various functions such as automatic shifting of a transmission, disconnecting an engine from the drivetrain, and starting the engine. A mathematical relationship between pressure of the hydraulic actuator and the torque of the wet clutch may be referred to as clutch transfer function. Such a transfer function may be utilized to control the clutch torque. A linear approximation of such a transfer function may be utilized by a vehicle propulsion system to control automatic shifting within the vehicle transmission and/or to control a clutch-based engine start. Wet clutch behavior and a corresponding transfer function that is utilized to control the clutch may be sensitive to engagement conditions. Wet clutch transfer functions that are observed during testing of a clutch on a test stand may differ from the transfer functions observed while operating the same clutch in a vehicle equipped with non-production instrumentation for studying the torque of the clutch.

A wet clutch transfer function behaves linearly under certain conditions, but not under all conditions, making the use of linear approximation acceptable under such certain conditions. A wet clutch transfer function becomes non-linear under other certain conditions, making the use of linear approximation inaccurate and less desirable for robust clutch control under such other certain conditions. Also, a clutch transfer function may vary over a life of a vehicle and may vary from vehicle to vehicle. The use of an inaccurate transfer function may affect clutch control robustness and drivability. Identification and construction of an accurate wet clutch transfer function in a production vehicle may be difficult because it requires an accurate determination of clutch torque at the time of clutch engagement without a specialized torque sensing device.

It is desirable to develop a method to adaptively identify a wet clutch transfer function in a vehicle that applies under all clutch slip conditions, such as hydrodynamic lubrication, mixed lubrication, and boundary lubrication, at the time of clutch engagement without requiring a specialized torque sensing device. In hydrodynamic lubrication, clutch interface is fully lubricated with transmission fluid with no physical contact in-between. The clutch torque is hydrodynamically carried by fluid shearing between rotating clutch plates. In mixed lubrication, the clutch plates establish a limited physical contact at their surface asperities, while partially retaining fluid layer in-between. The clutch torque is carried by both viscous shear and mechanical friction between rotating clutch plates. In boundary lubrication, the transmission fluid is squeezed out from the interface between clutch plates. The clutch torque is entirely carried by mechanical friction between rotating clutch plates. The method described herein adaptively identifies and constructs a clutch transfer function based on the use of an IMU signal, $a_{imu}$, without a specialized torque sensing device. Such an IMU signal, $a_{imu}$, is described in U.S. patent application Ser. No. 16/928,707, filed on Jul. 14, 2020, which is incorporated by reference herein in its entirety.

The clutch transfer function described herein is adaptively identified and constructed for all lubrication conditions at the frictional interface based on actual operating conditions at the time of engagement in a vehicle. The method described herein includes a mathematical equation to calculate the torque of an engine disconnect clutch (e.g., disconnect clutch 26) during an engine start or restart control based on the use of the IMU signal, $a_{imu}$. The engine disconnect clutch torque $T_{K0}(i)$ is calculated during engine start and restart events that correspond to specific conditions that are assumed by the engine disconnect clutch torque calculation equation. For example, the engine disconnect clutch torque $T_{K0}(i)$ is calculated during engine start or restart events if there is no gear shifting within a transmission (e.g., gearbox 24) of the vehicle, if there is no braking of the vehicle, and if the steering angle is less than a pre-determined threshold.

The engine disconnect clutch torque $T_{K0}(i)$ is calculated at a desired time interval, where i denotes a time step. The engine disconnect clutch torque $T_{K0}(i)$ is mapped against the disconnect clutch actuator pressure $P_{K0}(i)$ to form a transfer function data set $\{T_{K0}(i), P_{K0}(i), i=1, 2, \ldots, n\}$ for each engine restart event where $P_{K0}(i)$ may be measured or estimated. The transfer function data set may explicitly represent a hysteresis loop. The transfer function data set may be binned or assigned to a pre-determined class $C_j(j=1, 2, \ldots)$ based on operating conditions at the time of engagement. The pre-determined class $C_j(j=1, 2, \ldots)$ may be determined based on measured or estimated conditions such as oil temperature or initial clutch slip speed using onboard temperature or speed sensors, respectively. The classification of transfer function data sets may be conducted by the controller 50 or in cloud computing storage. A mathematical regression may be performed to determine the transfer function equation for transfer function data sets in each cluster or class $C_j$.

The Transfer function equation may be linear or nonlinear. The transfer function equation may mathematically represent hysteresis loop. Mathematical regression may be used to determine the transfer function equation, which may be conducted by the controller 50 or in cloud computing storage. The mathematical regression utilized to determine the transfer function equation may be conducted in a recursive manner or in a batch mode. In a batch mode, a regression method is applied to a collection of transfer function data sets in each cluster $C_j$ to fit a linear or a nonlinear function. In a recursive mode, a method such as recursive least square method or Kalman filtering is applied to update constants in the regression equation when a new transfer function data set becomes available. The transfer function equation disclosed herein may be used in powertrain control and diagnosis. The transfer function may be selected during clutch control from one of the predetermined classes $C_j(j=1, 2, \ldots)$ to match the operating condition at the time of clutch engagement during either powertrain control or diagnosis.

Figure 2:
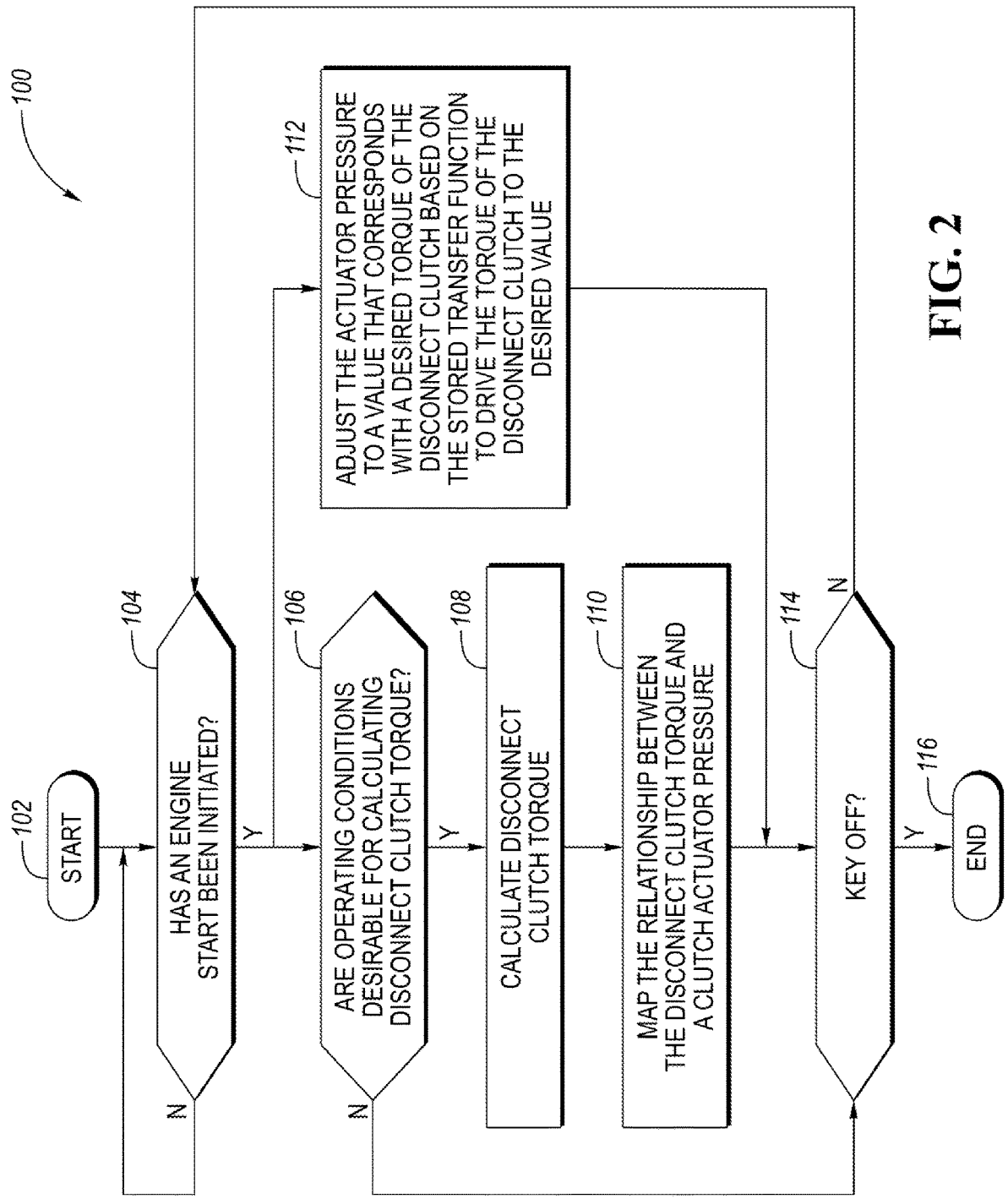
FIG. 2 is a flowchart illustrating a method of controlling the torque of the disconnect clutch.

Referring to FIG. 2, a flowchart of a method 100 of controlling the torque of the disconnect clutch 26 is illustrated. The method 100 may be stored as control logic and/or an algorithm within the controller 50 or in cloud computing storage. The controller 50 may implement the method 100 by controlling the various components of the vehicle 10. The method 100 begins at start block 102. Start block 102 may correspond to an engagement of a vehicle ignition or a "key on" condition that indicates an operator initiating a new drive cycle for operating the vehicle.

The method 100 then moves on to block 104, where it is determined if an engine start has been initiated. More specifically, the step at block 104 may determine if an engine start or restart has been initiated where the disconnect clutch 26 is or will be utilized to start the engine 14. If an engine start or restart has not been initiated, the method 100 recycles back to the beginning of block 104. If an engine start or restart has been initiated, the method 100 moves on to block 106 where it is determined if the operating or driving conditions of the vehicle are desirable for calculating the torque of the disconnect clutch during the engine start or restart. The operating or driving conditions of the vehicle are desirable for calculating the torque of the disconnect clutch when the specific conditions that are assumed by the engine disconnect clutch torque calculation equation (i.e., equation 1 listed below) are present during the engine start or restart. For example, the engine disconnect clutch torque may be calculated during engine start or restart events during operating or driving conditions that include the transmission (e.g., gearbox 24) experiencing no gear shifting, no (i.e., zero) vehicle braking, and the steering angle being less than a pre-determined threshold (e.g., the steering angle is less than 10°).

If the operating or driving conditions of the vehicle are desirable for calculating the torque of the disconnect clutch during the engine start or restart, the method moves on to block 108. At block 108, the toque of the disconnect clutch is calculated according to equations (1) and (2):

$$T_{K0} = T_{Mtr} - (I_{Mtr} + I_{impeller})\alpha_{Mtr} + (TR-1)(\omega_{mtr}/K)^2 - \frac{T_D + I_{out}\alpha_{out}}{\eta \cdot GR} \quad (1)$$

$$T_D = k_1 + k_2 a_{imu} + k_3 v + k_4 v^2 \quad (2)$$

where $T_{K0}$ is the torque of the disconnect clutch 26, $T_{Mtr}$ is the estimated torque of the M/G 18, $I_{Mtr}$ is the inertia of the M/G 18, $I_{impeller}$ is the inertia of the torque converter impeller 29, $\alpha_{Mtr}$ is angular acceleration of the M/G 18, TR is the torque ratio of the torque converter 22, $\omega_{mtr}$ is the angular speed of the M/G 18, K is the K factor of the torque converter 22, $T_D$ is the torque at the output of the transmission gearbox 24 (i.e., the torque of output shaft 36), $I_{out}$ is the lumped inertia of the transmission (i.e., the lumped inertia of the torque converter 22 and the gearbox 24), $\alpha_{out}$ is the angular acceleration of the transmission output shaft 36, $\eta$ is the efficiency of the gearbox 24, GR is the gear ratio of the transmission at the time of engine restart (i.e., the gear ratio of gearbox 24), v is linear velocity of the vehicle, $a_{imu}$ is the IMU signal, and $k_1$, $k_2$, $k_3$, and $k_4$ are the mapping coefficients. It should be noted that equation (2) and the corresponding variables and coefficients are disclosed within U.S. patent application Ser. No. 16/928,707, filed on Jul. 14, 2020, which has been incorporated by reference in its entirety.

Next, the method 100 moves on to block 110 where the relationship between the disconnect torque $T_{K0}$ and the disconnect clutch actuator pressure $P_{K0}$ are mapped (i.e., the torque values of the disconnect clutch 26 are mapped to the corresponding values of the disconnect clutch actuator pressure $P_{K0}$) to derive or adjust the transfer function that represents the relationship between the disconnect torque $T_{K0}$ and the disconnect clutch actuator pressure $P_{K0}$. More specifically at block 110, the transfer function may be generated via applying a regression fit to a collection of transfer function data sets that consist of the mapped values of the disconnect clutch torque $T_{K0}$ and the disconnect clutch actuator pressure $P_{K0}$, such as a recursive least square method, or via applying a Kalman filter to the mapped values of the disconnect clutch torque $T_{K0}$ and the disconnect clutch actuator pressure $P_{K0}$. Multiple transfer functions may be constructed, specific to a range of operating conditions, such as transmission fluid temperature. The transfer function may be a linear function, a non-linear function, a linear function with a hysteresis loop, or a non-linear function with a hysteresis loop. Examples of linear and non-linear equations are illustrated by equations (3) and (4), respectively:

$$T_{k0}=C^*(P_{k0}-P_{Stroke}) \quad (3)$$

$$T_{K0}=F(P_{K0}) \quad (4)$$

where $P_{Stroke}$ is the stroke pressure of the disconnect clutch actuator (i.e., the pressure required to advance the disconnect clutch 26 to an initial engagement between the opposing sides of the disconnect clutch, which may be referred to as the "kiss point") and C is a gain value of a linear transfer function. $P_{Stroke}$ may be referred to as an offset value of a linear transfer function. $F(P_{K0})$ may be a second-order polynomial function, a power function or an exponential function. $F(P_{K0})$ may be a non-parametric function such as a neural network.

The transfer function may experience little or no changes within days or weeks once large amounts of data is collected. If new data is an outlier and varies significantly from other data points, such new data may be ignored and the transfer function would not be adjusted by such data. Furthermore, the transfer function may have had initial values that were stored in the controller 50 after the previous occurrence that the method 100 cycled through block 110 or at the end of a previous drive cycle. If the transfer function is updated at block 110, the new values of the transfer function are stored within the controller 50 and may replace the previous values of the transfer function.

The transfer function may include fitting several equations (linear or non-linear) to different clusters of data sets, where each cluster of data is specific to an operating condition. For example, a first equation may be fit to a data set that only includes values of disconnect torque $T_{K0}$ mapped to the disconnect clutch actuator pressure $P_{K0}$ during engine starts where the engine is started during a vehicle acceleration at a fully warmed transmission fluid temperature, while a second equation may be fit to a data set that only includes values of disconnect torque $T_{K0}$ mapped to the disconnect clutch actuator pressure $P_{K0}$ during engine starts where the engine is started at a low transmission fluid temperature.

The method 100 also includes block 112, where the disconnect clutch actuator pressure $P_{K0}$ is adjusted to a value that corresponds with a desired torque of disconnect torque $T_{K0}$ based on the transfer function in order to drive the torque of the disconnect clutch 26 to such a desired value in response to a command to control the torque of disconnect torque $T_{K0}$ to such a desired value. It should be noted that if the transfer function includes several fitting equations that are based on specific operating conditions of the vehicle, the specific equation fit to such an operating condition of the vehicle may be applied. The step in block 112 occurs simultaneously or in parallel with steps 106, 108, and 110.

Next, the method 100 moves on to block 114 where it is determined if the vehicle ignition has been disengaged, which corresponds to a "key off" condition that indicates the operator has turned off the vehicle and has terminated the current drive cycle. If the vehicle ignition has been disengaged, the method 100 ends at block 116. If the vehicle ignition has not been disengaged, the method 100 returns to block 104, where the process repeats.

Returning to block 106, if it is determined that the operating or driving conditions of the vehicle are not desirable for calculating the torque of the disconnect clutch during the engine start or restart, the method 100 moves directly on to 114. It should be noted that if the answer is "NO" at block 106 and if there is a command to adjust the torque of the disconnect clutch $T_{K0}$ to a desired value, an unadjusted transfer function that is stored from a previous drive cycle or from a previous cycle of the method through block 110 may be applied to control the disconnect clutch actuator pressure $P_{K0}$ in order drive the torque of the disconnect clutch $T_{K0}$ to such a desired value. It should be understood that the flowchart in FIG. 2 is for illustrative purposes only and that the method 100 should not be construed as limited to the flowchart in FIG. 2. Some of the steps of the method 100 may be rearranged while others may be omitted entirely. Furthermore, it should be understood that the controller 50 will cycle through the method 100 during each start of the engine 14 over each drive cycle and over life of the vehicle. It should be noted that the method 100 in FIG. 2 is described in U.S. patent application Ser. No. 16/928,715, filed on Jul. 14, 2020, which is incorporated by reference herein in its entirety.

Figure 3:
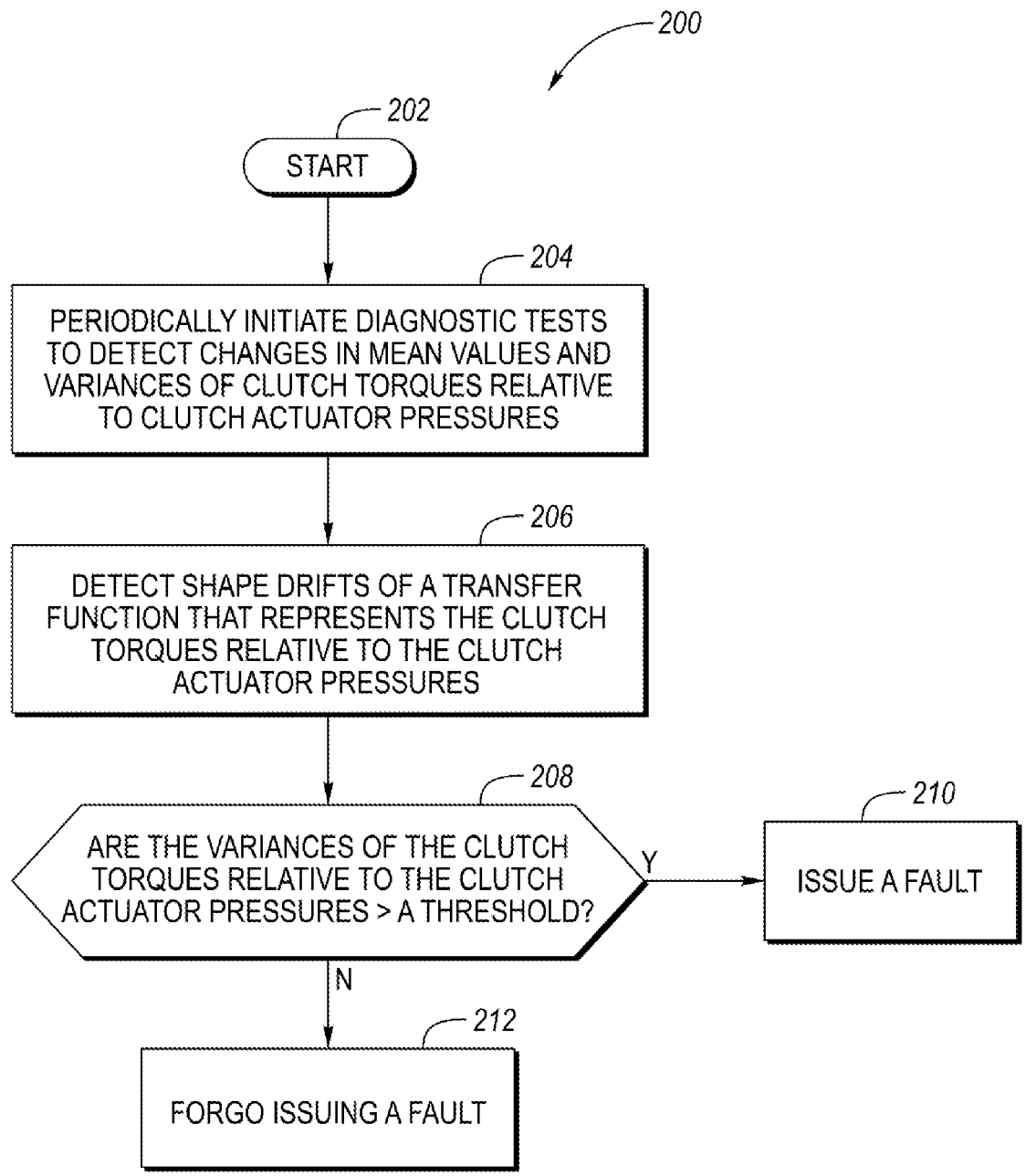
FIG. 3 is a flowchart illustrating a diagnostic method for tracking the functional quality of an engine disconnect clutch.

Referring to FIG. 3, a flowchart of a diagnostic method 200 for tracking the functional quality of the disconnect clutch 26 is illustrated. The method 200 may be stored as control logic and/or an algorithm within the controller 50 or in cloud computing storage. The controller 50 may implement the method 200 by controlling the various components of the vehicle 10. The method 200 begins at start block 202. Start block 202 may correspond to an engagement of a vehicle ignition or a "key on" condition that indicates an operator initiating a new drive cycle for operating the vehicle.

The method 200 then moves on to block 204, where the controller 50 periodically initiates diagnostic tests to detect changes in statistical mean values and variances of the disconnect cutch torque relative to the disconnect clutch actuator pressure over the operating life of the disconnect clutch 26. More specifically, during the diagnostic tests, probabilistic representations of the transfer function that is utilized to the control the disconnect clutch torque relative to the actuator pressure (i.e., the transfer function referred to in the description of FIG. 2) are constructed from the transfer function data sets from a pre-determined sampling time window or a number of events. The sampling window will include a plurality of events where the transfer function is utilized to adjust the disconnect clutch actuator pressure to control the torque of the disconnect clutch 26 during engine starts.

The probabilistic representations of the transfer function are utilized to determine mean values and variances in the torque values of the disconnect clutch 26 relative to the disconnect clutch torque actuator pressure values during each sampling window. The mean values and variances may be determined via a non-parametric model, such as a Gaussian process regression. Gaussian process regression is a nonparametric kernel-based probabilistic regression model. Such a Gaussian process regression model for determining probabilistic representations of the transfer function that are utilized to determine mean values and variances in the torque values of the disconnect clutch 26 relative to the disconnect clutch torque actuator pressure values is described in U.S. patent application Ser. No. 17/181,379, filed on Feb. 22, 2021, which is incorporated by reference herein in its entirety.

Figure 4:
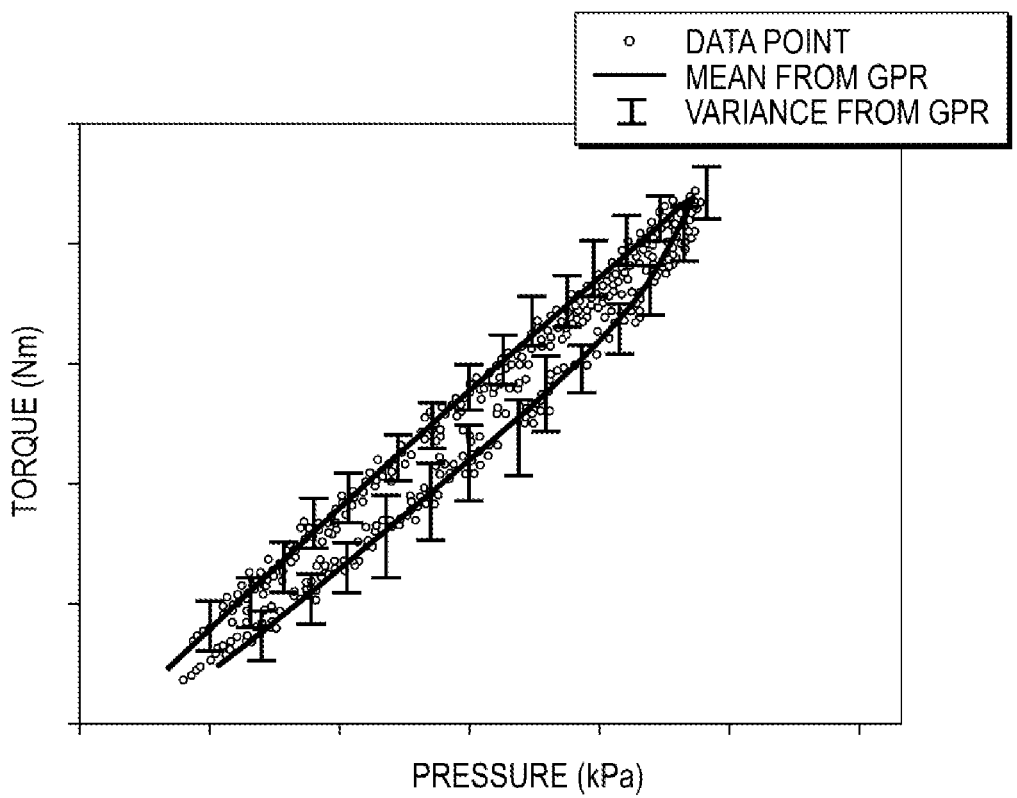
FIGS. 4 and 5 are graphs illustrating the probabilistic representation of a transfer function for controlling the engine disconnect clutch.
Figure 5:
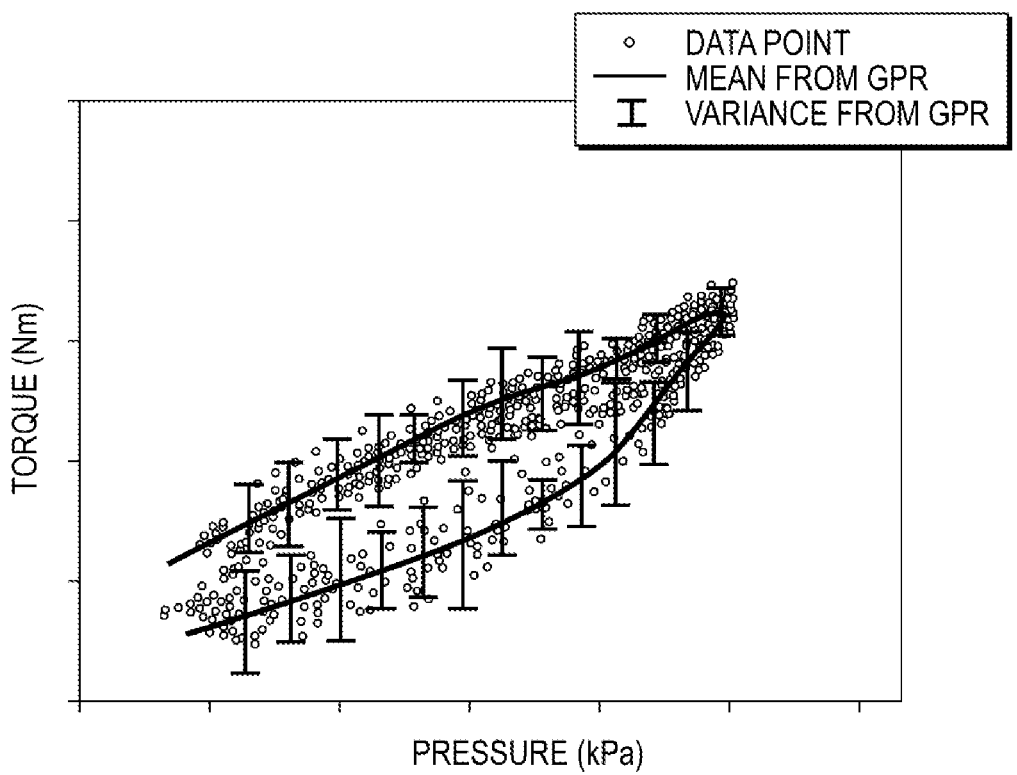

Changes in the mean values and variances may be determined by comparing the probabilistic representations of the transfer function between two sampling time windows. For example, FIG. 4 is a probabilistic representation of the transfer function when the life of operation of the vehicle 10 is at approximately 10,000 miles and FIG. 5 is a probabilistic representation of the transfer function when the life of operation of the vehicle 10 is at approximately 100,000 miles. The dots show data points that are calculated and recorded during engine restart event. The solid line is the mean torque or $m(x_{N+1})$ at each pressure level, showing hysteresis behavior. The error bar is the variance or $\pm\sigma(x_{N+1})$ at each pressure level.

Changes in the mean values provide a quantitative measure of a shape drift in the disconnect characteristics and the transfer function, as the transfer function is adapted over time according to method 100. Such a shape drift may indicate that the hardware of the disconnect clutch 26 has degraded (e.g., the friction plates of the disconnect clutch 26 have degraded due to wear). However, the quality of the engine starts via the disconnect clutch 26 will not degrade if the controller 50 compensates for the shape drift (i.e., the quality of engine starts won't change if the transfer function that the controls the disconnect clutch torque relative to the disconnect clutch actuator pressure is properly adapted over time according method 100 regardless of degradation of the disconnect clutch 26). Detecting changes in the shape drift of the transfer function is represented at block 206 in method 200, which is illustrated as occurring subsequent to block 204. A fault signal is issued if it is determined that the amount of shape drift exceeds the capabilities of the controller 50.

Increases in the variances in the torque values of the disconnect clutch 26 relative to the disconnect clutch torque actuator pressure values, on the other hand, may be indicative that the disconnect clutch 26 is operating at an increased variability, which may indicate a decrease in the functional quality of the disconnect clutch 26. At block 208, subsequent to to block 206, the method 200 determines if the variances in the torque values of the disconnect clutch 26 relative to the disconnect clutch torque actuator pressure values is greater than a threshold. If the answer at block 208 is "YES," the method 200 moves on to block 210, where the controller 50 issues a disconnect clutch fault, regardless of the presence of, absence of, or any amount of shape drift in the transfer function. The fault may be indicative of a failure of the disconnect clutch 26 to operate or may be indicative that the quality of operation of the disconnect clutch 26 has decreased such that service or maintenance is required. The disconnect clutch fault may include sending an alert signal to a vehicle service center through a cloud communication system for system prognostics if the level of increased variances is statistically significant, yet if it does not severely impact the quality of engine restart process. The disconnect clutch fault may include illuminating a fault light (e.g., a fault light on a dashboard or control panel), may be displayed on a screen (e.g., an interactive screen on a human machine interface), may include an audible notification (e.g., the fault may be issued as a sound or spoken words over a speaker within the vehicle 10), may be haptic (e.g., the fault may be issued via haptic signals transmitted to the steering wheel, driver seat, accelerator pedal, brake pedal, etc.), may be based on any combination described herein, or may be based on any notification system known in the art.

If the answer at block 208 is "NO," the method 200 moves on to block 212, where the controller 50 forgoes (i.e., does not) issuing the disconnect clutch fault, regardless of the presence of, absence of, or any amount of shape drift in the transfer function. The method 200 may also conduct a stochastic simulation of an engine start to give a probabilistic prediction of engine restart quality by the given probabilistic representation of transfer function. The stochastic simulation gives an accounting for probabilistic representation of transfer function, based on a method such as generalized polynomial chaos.

It should be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
   a powertrain having,
      a transmission having an input and an output,
      an engine configured to generate and deliver torque to the input, and
      a disconnect clutch configured to connect and disconnect the engine from the input, and to crank the engine to start the engine; and
   a controller programmed to,
      in response to each of a plurality of commands to start the engine via the disconnect clutch, close the disconnect clutch, adjust a transfer function that represents a relationship between a torque of the disconnect clutch and a clutch actuator pressure, and control the torque of the disconnect clutch based on the transfer function, and
      in response to variances of the torque of the disconnect clutch exceeding a threshold, issue a disconnect clutch fault, wherein changes in mean values of the torque of the disconnect clutch and changes in the variances of the torque of the disconnect clutch are determined via a non-parametric model.

2. The vehicle of claim 1, wherein the non-parametric model is a gaussian process regression.

3. The vehicle of claim 1, wherein the changes in the mean values of the torque of the disconnect clutch and the variances of the torque of the disconnect clutch are based on a data sample that includes at least a portion of the plurality of commands.

4. The vehicle of claim 1, wherein the changes in the mean values of the torque of the disconnect clutch correspond to a shape drift of the transfer function.

5. The vehicle of claim 4, wherein the controller is programmed to, in response to the shape drift of the transfer function and changes in the variances of the torque of the disconnect clutch exceeding the threshold, issue the disconnect clutch fault.

6. The vehicle of claim 4, wherein controller is programmed to, in response to the shape drift of the transfer function and changes in the variances of the torque of the disconnect clutch being less than the threshold, forgo issuing the disconnect clutch fault.

7. The vehicle of claim 4, wherein controller is programmed to, in response to a zero value for the shape drift of the transfer function and changes in variances of the torque of the disconnect clutch exceeding the threshold, issue the disconnect clutch fault.

8. A vehicle comprising:
   a powertrain having,
      a transmission having an input and an output,
      an engine configured to generate and deliver torque to the input, and
      a disconnect clutch configured to connect and disconnect the engine from the input, and to crank the engine to start the engine; and
   a controller programmed to,
      in response to each of a plurality of commands to start the engine via the disconnect clutch, close the disconnect clutch, adjust a transfer function that represents a relationship between a torque of the disconnect clutch and a clutch actuator pressure, and control the torque of the disconnect clutch based on the transfer function, and
      in response to variances of the torque of the disconnect clutch exceeding a threshold, issue a disconnect clutch fault, wherein changes in mean values of the torque of the disconnect clutch correspond to a shape drift of the transfer function.

9. The vehicle of claim 8, wherein the controller is programmed to, in response to the shape drift of the transfer function and changes in the variances of the torque of the disconnect clutch exceeding the threshold, issue the disconnect clutch fault.

10. The vehicle of claim 8, wherein controller is programmed to, in response to the shape drift of the transfer function and changes in the variances of the torque of the disconnect clutch being less than the threshold, forgo issuing the disconnect clutch fault.

11. The vehicle of claim 8, wherein controller is programmed to, in response to a zero value for the shape drift of the transfer function and changes in the variances of the torque of the disconnect clutch exceeding the threshold, issue the disconnect clutch fault.

12. The vehicle of claim 8, wherein the changes in the mean values of the torque of the disconnect clutch and changes in the variances of the torque of the disconnect clutch are determined via a non-parametric model.

13. The vehicle of claim 12, wherein the non-parametric model is a gaussian process regression.

14. The vehicle of claim 12, wherein the changes in the mean values of the torque of the disconnect clutch and the variances of the torque of the disconnect clutch are based on a data sample that includes at least a portion of the plurality of commands.

15. A vehicle comprising:
   a powertrain having,
      a transmission having an input and an output,
      an engine configured to generate and deliver torque to the input, and
      a disconnect clutch configured to connect and disconnect the engine from the input, and to crank the engine to start the engine; and
   a controller programmed to,
      in response to each of a plurality of commands to start the engine via the disconnect clutch, close the disconnect clutch, adjust a transfer function that represents a relationship between a torque of the disconnect clutch and a clutch actuator pressure, and control the torque of the disconnect clutch based on the transfer function, and
      in response to a shape drift of the transfer function and changes in variances of the torque of the disconnect clutch exceeding a threshold, issue a disconnect clutch fault, and
      in response to the shape drift of the transfer function and the changes in the variances of the torque of the disconnect clutch being less than the threshold, forgo issuing the disconnect clutch fault.

16. The vehicle of claim 15, wherein changes in mean values of the torque of the disconnect clutch and changes in the variances of the torque of the disconnect clutch are determined via a non-parametric model.

17. The vehicle of claim 16, wherein the non-parametric model is a gaussian process regression.

18. The vehicle of claim 16, wherein the changes in the mean values of the torque of the disconnect clutch and the variances of the torque of the disconnect clutch are based on a data sample that includes at least a portion of the plurality of commands.

19. The vehicle of claim 15, wherein changes in mean values of the torque of the disconnect clutch correspond to the shape drift of the transfer function.

20. The vehicle of claim 15, wherein controller is programmed to, in response to a zero value for the shape drift of the transfer function and changes in variances of the torque of the disconnect clutch exceeding the threshold, issue the disconnect clutch fault.

* * * * *